United States Patent
Chen et al.

(10) Patent No.: US 12,046,050 B2
(45) Date of Patent: Jul. 23, 2024

(54) SYSTEMS AND METHODS FOR DETECTING TRAFFIC LIGHTS USING HIERARCHICAL MODELING

(71) Applicant: Toyota Research Institute, Inc., Los Altos, CA (US)

(72) Inventors: Kun-Hsin Chen, San Francisco, CA (US); Kuan-Hui Lee, San Jose, CA (US); Chao Fang, Sunnyvale, CA (US); Charles Christopher Ochoa, San Francisco, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 17/721,868

(22) Filed: Apr. 15, 2022

(65) Prior Publication Data

US 2023/0334873 A1     Oct. 19, 2023

(51) Int. Cl.
| | |
|---|---|
| *G06V 20/00* | (2022.01) |
| *B60W 30/14* | (2006.01) |
| *G06T 7/70* | (2017.01) |
| *G06V 20/58* | (2022.01) |

(52) U.S. Cl.
CPC ......... *G06V 20/584* (2022.01); *B60W 30/143* (2013.01); *G06T 7/70* (2017.01); *B60W 2420/42* (2013.01); *B60W 2554/4029* (2020.02); *B60W 2554/4045* (2020.02); *B60W 2555/60* (2020.02); *B60W 2720/10* (2013.01); *G06T 2207/30252* (2013.01)

(58) Field of Classification Search
CPC .................. G06V 20/584; G06T 7/70; G06T 2207/30252; B60W 30/143;

(Continued)

(56) References Cited

U.S. PATENT DOCUMENTS

| | | | |
|---|---|---|---|
| 2019/0012551 A1* | 1/2019 | Fung | ............. G06V 20/584 |
| 2019/0122059 A1* | 4/2019 | Zhou | ............. G06V 10/82 |

(Continued)

FOREIGN PATENT DOCUMENTS

| | | |
|---|---|---|
| CN | 106886757 A | 6/2017 |
| CN | 110069986 A | 7/2019 |
| WO | 2019200477 A1 | 10/2019 |

OTHER PUBLICATIONS

Müller et al., "Detecting Traffic Lights by Single Shot Detection," 2018 21st International Conference on Intelligent Transportation Systems (ITSC), 2018, pp. 266-273.

(Continued)

*Primary Examiner* — Tiffany P Ohman
(74) *Attorney, Agent, or Firm* — Christopher G. Darrow; Darrow Mustafa PC (57) ABSTRACT

System, methods, and other embodiments described herein relate to accurately distinguishing a traffic light from other illuminated objects in the traffic scene and detecting states using hierarchical modeling. In one embodiment, a method includes detecting, using a machine learning (ML) model, two-dimensional (2D) coordinates of illuminated objects identified from a monocular image of a traffic scene for control adaptation by a control model. The method also includes assigning, using the ML model, computed probabilities to the illuminated objects for categories within a hierarchical ontology of environmental lights associated with the traffic scene, wherein one of the probabilities indicates existence of a traffic light instead of a brake light in the traffic scene. The method also includes executing a task by the control model for a vehicle according to the 2D coordinates and the computed probabilities.

20 Claims, 5 Drawing Sheets

(58) Field of Classification Search
CPC ..... B60W 2554/4029; B60W 2555/60; B60W 2554/4045; B60W 2420/42; B60W 2720/10
USPC .......................................................... 701/93
See application file for complete search history.

(56) References Cited

U.S. PATENT DOCUMENTS

| | | |
|---|---|---|
| 2020/0134333 A1 | 4/2020 | Vishal et al. |
| 2020/0151468 A1 | 5/2020 | Hermalyn et al. |
| 2021/0211568 A1 | 7/2021 | Zhou et al. |
| 2021/0350152 A1 | 11/2021 | Chen et al. |
| 2022/0105926 A1* | 4/2022 | Zhang .................... G08G 1/166 |

OTHER PUBLICATIONS

Chen et al., "Accurate and Reliable Detection of Traffic Lights Using Multiclass Learning and Multiobject Tracking," IEEE intelligent transportation systems magazine, vol. 8, No. 4, 2016, pp. 28-42.

Pon et al., "A Hierarchian Deep Architecture and Mini-Batch Selection Method For Joint Traffic Sign and Light Detection," 2018 15th Conference on Computer and Robot Vision (CRV), 2018, pp. 102-109.

Weber et al., "HDTLR: a CNN based Hierarchical Detector for Traffic Lights," 2018 21st International Conference on Intelligent Transportation Systems (ITSC), Nov. 2018, pp. 255-260.

* cited by examiner

SYSTEMS AND METHODS FOR DETECTING TRAFFIC LIGHTS USING HIERARCHICAL MODELING

TECHNICAL FIELD

The subject matter described herein relates, in general, to detecting illuminated objects in a traffic scene, and, more particularly, to distinguishing a traffic light from other illuminated objects in the traffic scene and detecting states using hierarchical modeling.

BACKGROUND

Vehicles have sensors that provide data used for awareness and object identification by detection systems. A camera is one sensor that captures images for a detection system to perceive objects such as pedestrians, other vehicles, and traffic conditions. For example, a front camera of a vehicle captures an image having multiple vehicles approaching an intersection. In one approach, the detection system may process the captured image to identify and locate a traffic light utilized for tasks by other vehicle systems (e.g., automated driving).

In general, the further awareness is developed by the vehicle about a surrounding environment, the better the vehicle can supplement a driver with information to assist in driving. However, detection systems can encounter difficulties with distinguishing certain objects within an image. For example, a detection system may erroneously identify an illuminated object from another vehicle as a traffic light. This potential error can impact the safety of downstream processes, such as motion planning and automation for the vehicle.

SUMMARY

In one embodiment, example systems and methods relate to accurately distinguishing a traffic light from other illuminated objects in the traffic scene and detecting states using a hierarchical ontology and modeling. In various implementations, systems detecting traffic lights from an image can misidentify an illuminated object as a traffic light. For example, a detection system locates and identifies a brake light of a vehicle as a traffic light due to the objects having similar perceptual features. This misidentification can impact the safety for other vehicle systems. For instance, a vehicle experiences a rear-end collision after slowing down from misinterpreting a brake light as a red light. Therefore, in one embodiment, a detection system locates illuminated objects from an image (e.g., a monocular image) of a traffic scene and computes probabilities together within a hierarchical ontology using a machine learning (ML) model. In particular, the hierarchical ontology may include categories arranged in layers having traffic light (e.g., multi-lamp signals, railroad signals, crosswalk signals, etc.), brake light, and pedestrian light types and associated states. The detection system may assign computed probabilities for an object within categories of the hierarchical ontology using the ML model. Furthermore, a control model can execute a task using the locations and the computed probabilities. In this way, the detection system accurately identifies a traffic light by using unified modeling that locates and computes probabilities for categories within a hierarchical ontology associated with environmental lights.

In one embodiment, a detection system for accurately distinguishing a traffic light from other illuminated objects in the traffic scene and detecting states using a hierarchical ontology and modeling is disclosed. The detection system includes a processor and a memory storing instructions that, when executed by the processor, cause the processor to detect, using a ML model, two-dimensional (2D) coordinates of illuminated objects identified from a monocular image of a traffic scene for control adaptation by a control model. The instructions also include instructions to assign, using the ML model, computed probabilities to the illuminated objects for categories within a hierarchical ontology of environmental lights associated with the traffic scene, wherein one of the probabilities indicates existence of a traffic light instead of a brake light in the traffic scene. The instructions also include instructions to execute a task by the control model for a vehicle according to the 2D coordinates and the computed probabilities.

In one embodiment, a non-transitory computer-readable medium for accurately distinguishing a traffic light from other illuminated objects in the traffic scene and detecting states using a hierarchical ontology and modeling and including instructions that when executed by a processor cause the processor to perform one or more functions is disclosed. The instructions include instructions to detect, using a ML model, 2D coordinates of illuminated objects identified from a monocular image of a traffic scene for control adaptation by a control model. The instructions also include instructions to assign, using the ML model, computed probabilities to the illuminated objects for categories within a hierarchical ontology of environmental lights associated with the traffic scene, wherein one of the probabilities indicates existence of a traffic light instead of a brake light in the traffic scene. The instructions also include instructions to execute a task by the control model for a vehicle according to the 2D coordinates and the computed probabilities.

In one embodiment, a method for accurately distinguishing a traffic light from other illuminated objects in the traffic scene and detecting states using a hierarchical ontology and modeling is disclosed. In one embodiment, the method includes detecting, using a ML model, 2D coordinates of illuminated objects identified from a monocular image of a traffic scene for control adaptation by a control model. The method also includes assigning, using the ML model, computed probabilities to the illuminated objects for categories within a hierarchical ontology of environmental lights associated with the traffic scene, wherein one of the probabilities indicates existence of a traffic light instead of a brake light in the traffic scene. The method also includes executing a task by the control model for a vehicle according to the 2D coordinates and the computed probabilities.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the detection of traffic lights from other objects in an image using machine learning (ML), a hierarchical ontology, and modeling are disclosed herein. In various implementations, perception systems (e.g., a neural network (NN)) detecting traffic lights from an image can locate and identify an illuminated object as a traffic light. For example, a detection system of a vehicle (e.g., ego vehicle) identifies a brake light of a vehicle ahead (e.g., ado vehicle) as a traffic light because these lights have similar perceptual features to a perception system. This misidentification can impact the safety of the vehicle and surrounding vehicles. For instance, a vehicle has a rear-end collision after slowing down in traffic from misinterpreting a brake light as a red light. Therefore, in one embodiment, a detection system uses a unified ML model that detects coordinates (e.g., two-dimensional (2D) location) of illuminated objects from an image (e.g., a monocular image) and computes probabilities that accurately distinguish between a traffic light and other environmental lights. Here, the environment lights may be a traffic light (e.g., multi-lamp signals, railroad signals, crosswalk signals, etc.), a brake light, a pedestrian light, and so on. Furthermore, the environmental lights and related states can form categories of a hierarchical ontology for a traffic scene. An ontology may represent categories according to type, state, and relations of various illuminated objects within traffic scenes. As such, the detection system computes and assigns probabilities to the illuminated objects for the various categories, including indicating the existence of a traffic light from a brake light in the traffic scene.

Moreover, in various implementations, the hierarchical ontology has layers organizing various environmental lights. For example, a first layer includes a traffic light, a brake light, and a foreign light. A second layer may include shape categories and a third layer color categories. The detection system may compute probabilities that illuminated objects are associated with the categories, such as by layer. In addition, a probability computed for one layer may be an independent, combined, or conditional probability of another layer. For instance, a state probability (e.g., a red and round traffic light) for a third layer is a combined probability from the first layer (e.g., light type) and a second layer (e.g., light shape). Accordingly, the detection system identifies a traffic light from a brake light in an image and computes probabilistic states within a hierarchical ontology using a unified ML model, thereby improving accuracy and efficiency.

Figure 1:
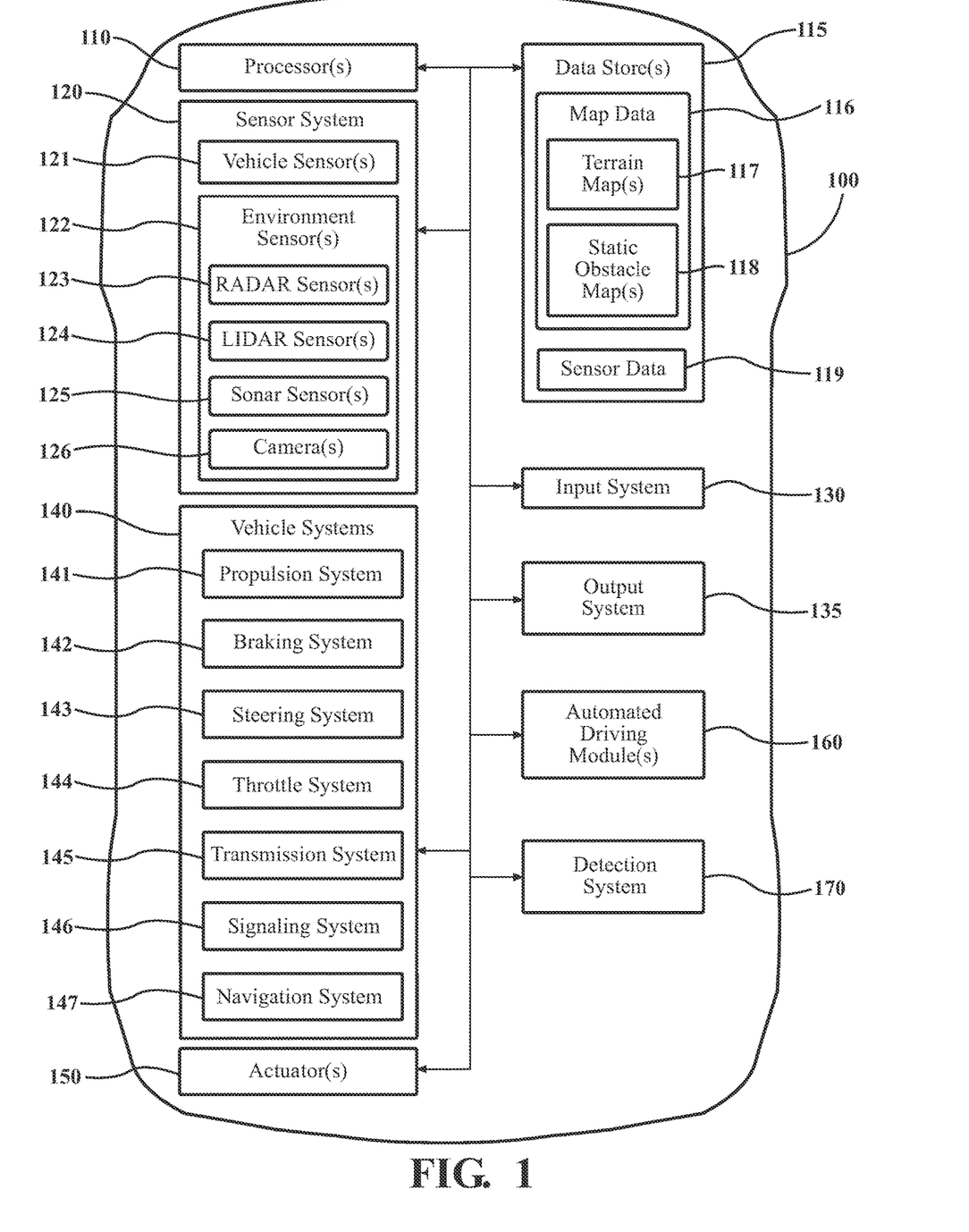
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a detection system uses road-side units (RSU), consumer electronics (CE), mobile devices, robots, drones, and so on that benefit from the functionality discussed herein associated with detecting traffic lights from other objects in an image using ML and hierarchical modeling.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a detection system 170 that is implemented to perform methods and other functions as disclosed herein relating to improving detection of traffic lights from other objects in an image by using ML and hierarchical modeling. The detection system 170, in various embodiments, is implemented partially within the vehicle 100. For example, in one approach, functionality associated with at least one module of the detection system 170 is implemented within the vehicle 100 while further functionality is implemented within a cloud-based computing system.

Figure 2:
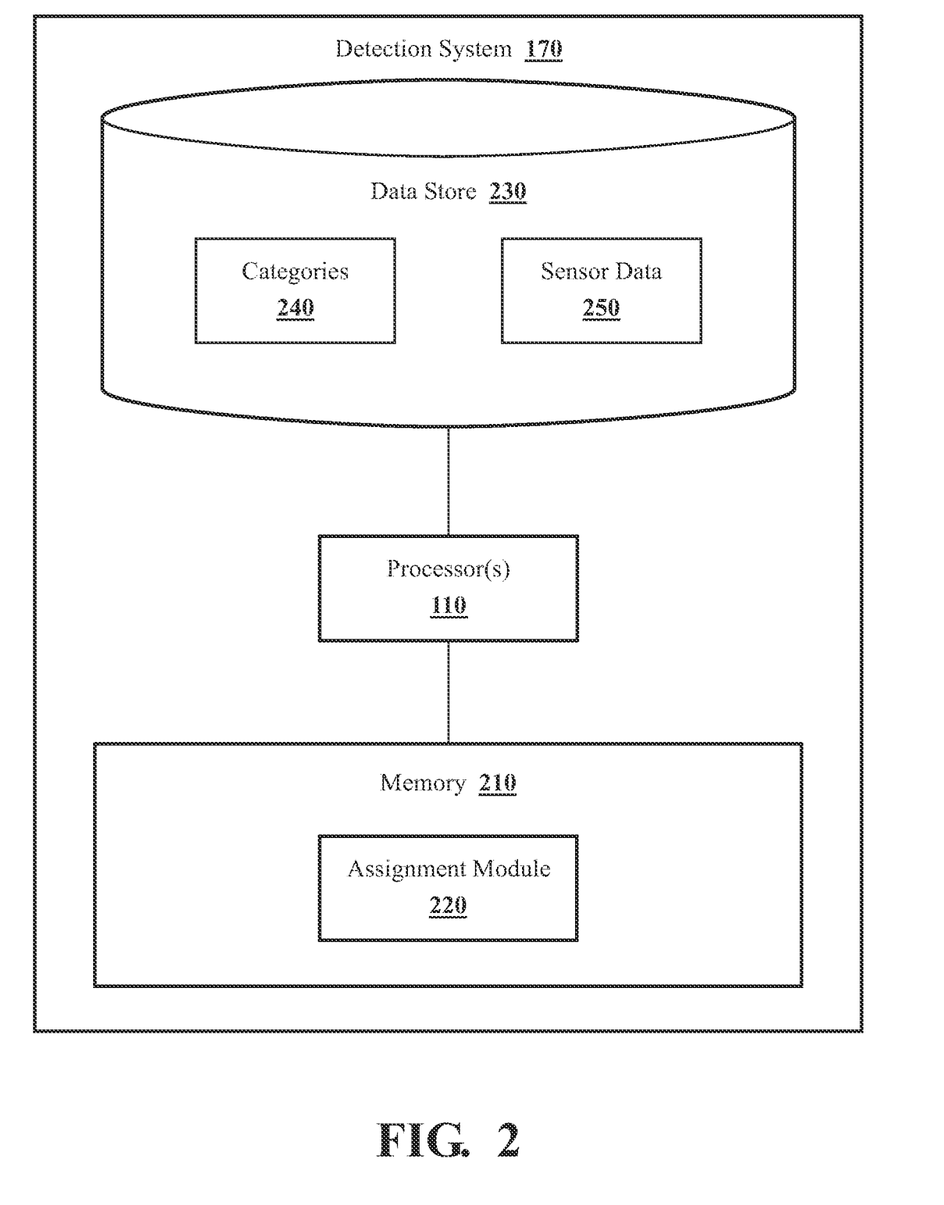
FIG. 2 illustrates one embodiment of a detection system that is associated with accurately distinguishing a traffic light from other illuminated objects in a traffic scene and detecting states using hierarchical modeling.

With reference to FIG. 2, one embodiment of the detection system 170 of FIG. 1 is further illustrated. The detection system 170 is shown as including a processor(s) 110 from the vehicle 100 of FIG. 1. Accordingly, the processor(s) 110 may be a part of the detection system 170, the detection system 170 may include a separate processor from the processor(s) 110 of the vehicle 100, or the detection system 170 may access the processor(s) 110 through a data bus or another communication path. In one embodiment, the detection system 170 includes a memory 210 that stores an assignment module 220. The memory 210 is a random-access memory (RAM), a read-only memory (ROM), a hard-disk drive, a flash memory, or other suitable memory for storing the assignment module. The assignment module 220 is, for example, computer-readable instructions that when executed by the processor(s) 110 cause the processor(s) 110 to perform the various functions disclosed herein.

The detection system 170 as illustrated in FIG. 2 is generally an abstracted form of the detection system 170. The assignment module 220 and/or the detection system 170 generally include instructions that function to control the processor(s) 110 to receive data inputs from one or more sensors of the vehicle 100. As provided for herein, the detection system 170, in one embodiment, acquires the sensor data 250 that includes at least camera images, such as from a monocular or red/green/blue (RGB) camera. In further arrangements, the detection system 170 acquires the sensor data 250 from further sensors such as a radar 123, LIDAR sensors 124, and other sensors as may be suitable for identifying vehicles and locations of the vehicles.

Accordingly, the detection system 170, in one embodiment, controls the respective sensors to provide the data inputs in the form of the sensor data 250. Additionally, while the detection system 170 is discussed as controlling the various sensors to provide the sensor data 250, in one or more embodiments, the detection system 170 can employ other techniques to acquire the sensor data 250 that are either active or passive.

Moreover, in one embodiment, the detection system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the assignment module 220 in executing various functions. In one embodiment, the data store 230 includes the sensor data 250 along with, for example, metadata that characterize various aspects of the sensor data 250.

In one embodiment, the data store 230 further includes categories 240 associated with a hierarchical ontology that categorizes various illuminated objects of the traffic scene, such as by type, state, and relations. Here, the ontology may include multiple layers that form a hierarchy instead of a flat structure so that the probabilities computed by the detection system 170 improve inferences between a traffic light (e.g., multi-lamp signals, railroad signals, crosswalk signals, etc.) from other light sources. Each layer may be associated with categories to label illuminated objects within an image (e.g., monocular image) of a traffic or a driving scene. For example, a first layer can have traffic light, brake light, foreign light (e.g., pedestrian light), and so on categories. These types may reflect an entire lighting structure instead of individual bulbs for reducing computational loads to the detection system 170. A second layer that may be a level up or down, depending on a relative perspective, from the first layer can have round (e.g., solid round), arrow, left turn, right turn, brake light, red, green, and so on categories. Similarly, a third layer has red, green, and yellow categories related to one or more second layer categories. For instance, an arrow traffic light can have red, green, yellow, and so on states within the hierarchy.

The detection system 170 and/or assignment module 220, in one embodiment, is further configured to perform additional tasks beyond controlling the respective sensors to acquire and provide the sensor data 250. For example, the assignment module 220 includes instructions that cause the processor 110 to detect coordinates of illuminated objects identified from a monocular image of a traffic scene using a ML model (e.g., NN, perceptron, etc.). Here, the coordinates may indicate x-y position, h, and w geometries of the illuminated object relative to image pixels. For example, the h and w may be dimensions of a bounding box encompassing the illuminated object. Furthermore, the assignment module 220, using the ML model, may compute probabilities to the illuminated objects for categories within the hierarchical ontology for the traffic scene. Here, a probability can indicate the existence of a traffic light from a brake light in the traffic scene. Accordingly, the detection system 170 can output these probabilities related to traffic light detection and states so that other systems can reliably complete tasks for the vehicle 100.

Figure 3:
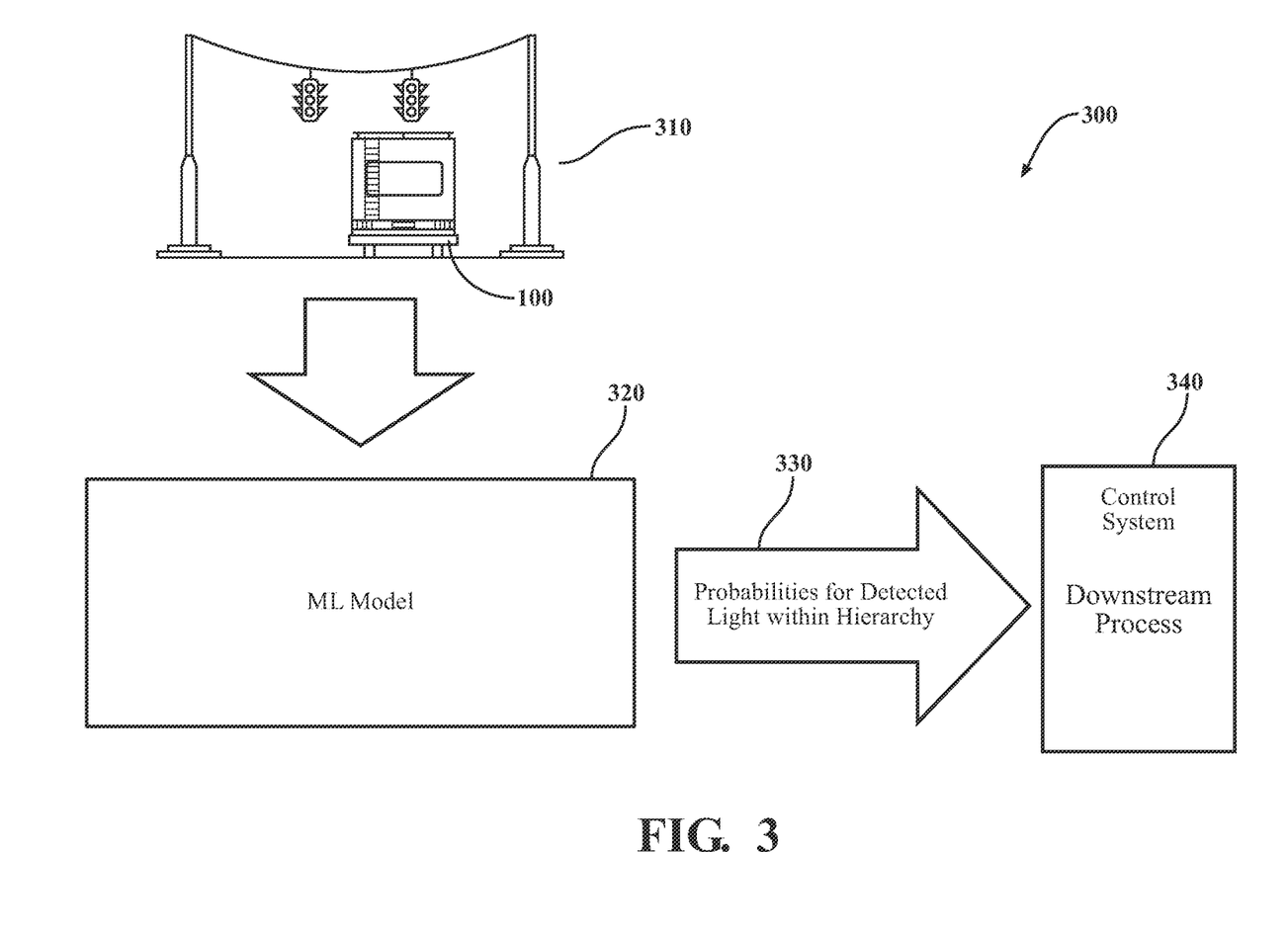
FIG. 3 illustrates an example of the detection system processing an image of a traffic scene and assigning probabilities to illuminated objects.

FIG. 3 illustrates an example 300 of the detection system 170 processing an image of a traffic scene and assigning probabilities to illuminated objects. Here, the vehicle 100 approaches the intersection 310. The detection system 170 may capture an image using one of the cameras 126 that may be a RGB or monocular camera. A ML model 320 (e.g., a NN, perceptron, etc.) detects locations of illuminated objects by processing the image. As further explained below, a hierarchical ontology of environmental lights may categorize or classify one or more of the illuminated objects. The environmental lights may be a traffic light, a turn signal, a brake light, a pedestrian light, and so on. In one approach, the detection system 170 computes a probability regarding each of the classifications for an illuminated object and outputs 330. The probabilities reflecting the existence of a traffic light from other light sources (e.g., brake light) may be communicated to a control system 340 involved with downstream processes, such as object detection, object tracking, and motion planning processes. In this way, the detection system 170 computes a probability accurately distinguishing a traffic light from a brake or other lights by using the hierarchical ontology.

Figure 4:
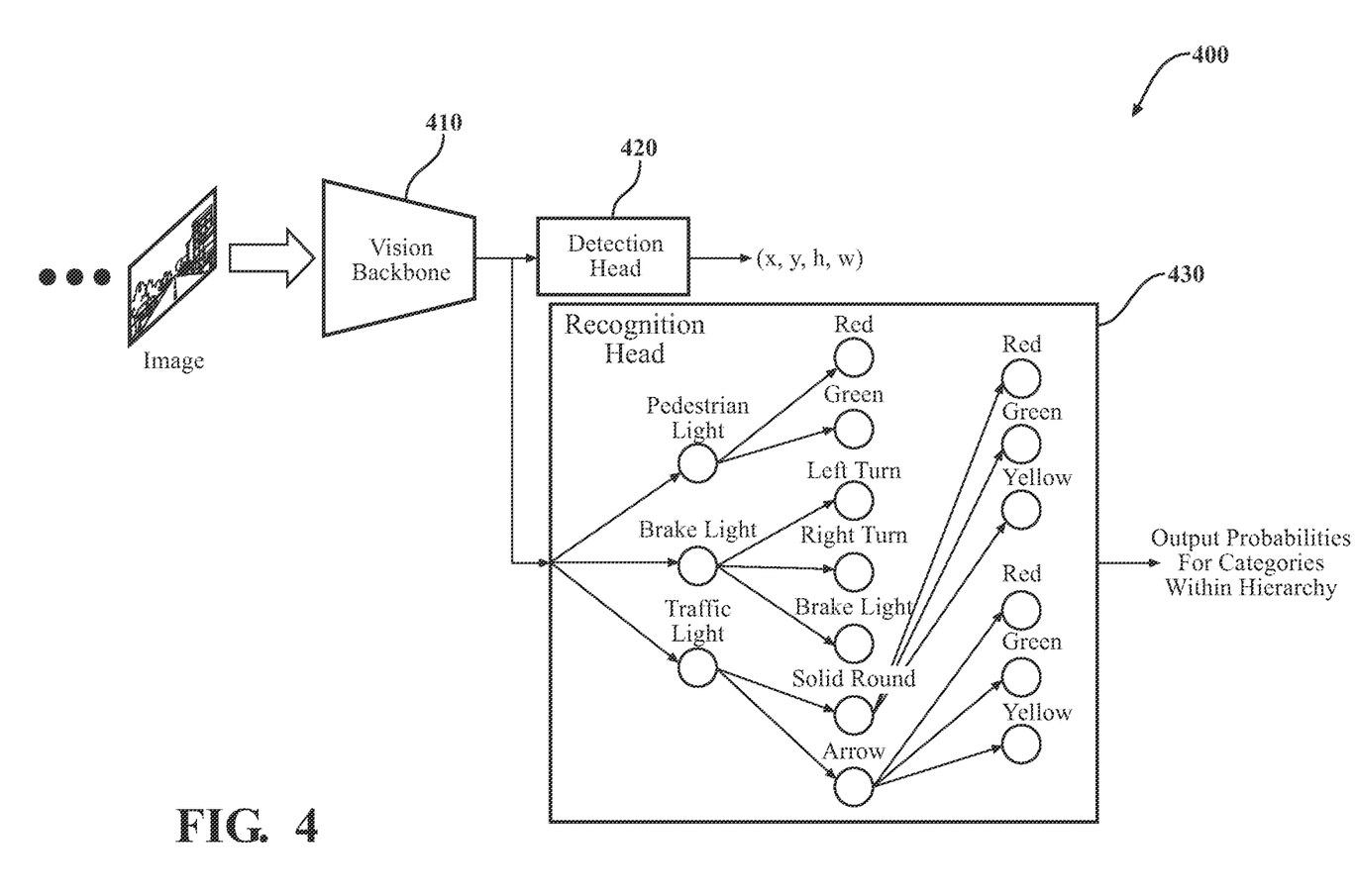
FIG. 4 illustrates one embodiment of a machine learning (ML) model that detects the illuminated objects within the image and assigns hierarchical probabilities according to categories for identifying traffic lights.

Now turning to FIG. 4, one embodiment of an ML model 400 that detects the illuminated objects within the image and assigns hierarchical probabilities according to categories for identifying traffic lights is illustrated. Here, the ML model (e.g., a NN, perceptron, etc.) is unified in that various types of illuminated objects are located and categorized using a hierarchical ontology. An encoder 410 may be a vision backbone that detects features of illuminated objects within an image taken from a certain or single view, such as by a monocular camera. The detection head 420 may decode the features and output a location of light irrespective of type (e.g., pedestrian, brake light, traffic light, etc.) using detected or extracted features from the encoder 410. In one approach, a location has coordinates indicating x-y position, h, and w geometries of an illuminated object relative to image pixels. For example, the h and w may be dimensions of a bounding box encompassing the illuminated object. Furthermore, these locations may be for an entire lighting structure instead of individual bulbs for reducing computational loads to the detection system 170 and/or assignment module 220.

Moreover, the recognition head 430 processes or decodes the encoded features and computes probabilities using a hierarchical ontology. In one approach, the ML model 400 architecture is a decision tree that is structured similar to a NN architecture and that implements a hierarchical ontology of the environmental lights associated with a traffic scene. Implementing a hierarchy instead of a flat structure allows the detection system 170 to distinguish a traffic light from other light sources through probabilistic relationships. The hierarchical ontology instead of a flat architecture also helps train the ML model 400 efficiently through intuitive loss function calculations. As such, the hierarchical ontology may have a first layer including a traffic light, a brake light, and a foreign light (e.g., pedestrian light) types. A second layer may include color/state/shape categories and a third layer color categories. In various implementations, the hierarchical ontology includes any number of layers, colors, states, and so on to fully categorize illuminated objects within a traffic scene.

In one approach, the detection system 170 computes probabilities that illuminated objects are associated with the categories, such as by layer. A probability can be a multiple or conditional between layers. For example, the detection system 170 computes the probabilities of a "Red, Solid Round, Traffic Light" as 0.378 by multiplying the probabilities:

"Traffic Light"(0.9)*"Solid Round"(0.7)*
    "Red"(0.6)=0.378.          Equation (1)

In other words, the detection system 170 uses the hierarchical probabilities by multiplying the probabilities from a higher level to a lower level (i.e., leaf nodes in a decision tree) along levels of a tree structure. In one approach, each layer or level has a probability independent of other layers.

In addition, a probability computed for one layer can be a conditional probability of another layer. For instance, a state probability (e.g., a traffic light that is solid round and red) for a third layer is conditioned from the first layer (e.g., light type) and a second layer (e.g., light shape). In one approach, the detection system 170 computes these probabilities to clearly (e.g., a binary output) distinguish a traffic light from a brake light existing within the traffic scene so that other processes can reliably execute a task for the vehicle 100. This operation can involve a threshold associated with a computed probability. For example, an automated driving system (ADS) treats an illuminated object as a traffic light in a control model (e.g., a NN estimating trajectories) when a threshold for a computed probability is met or unmet (e.g., a 70% probability).

Figure 5:
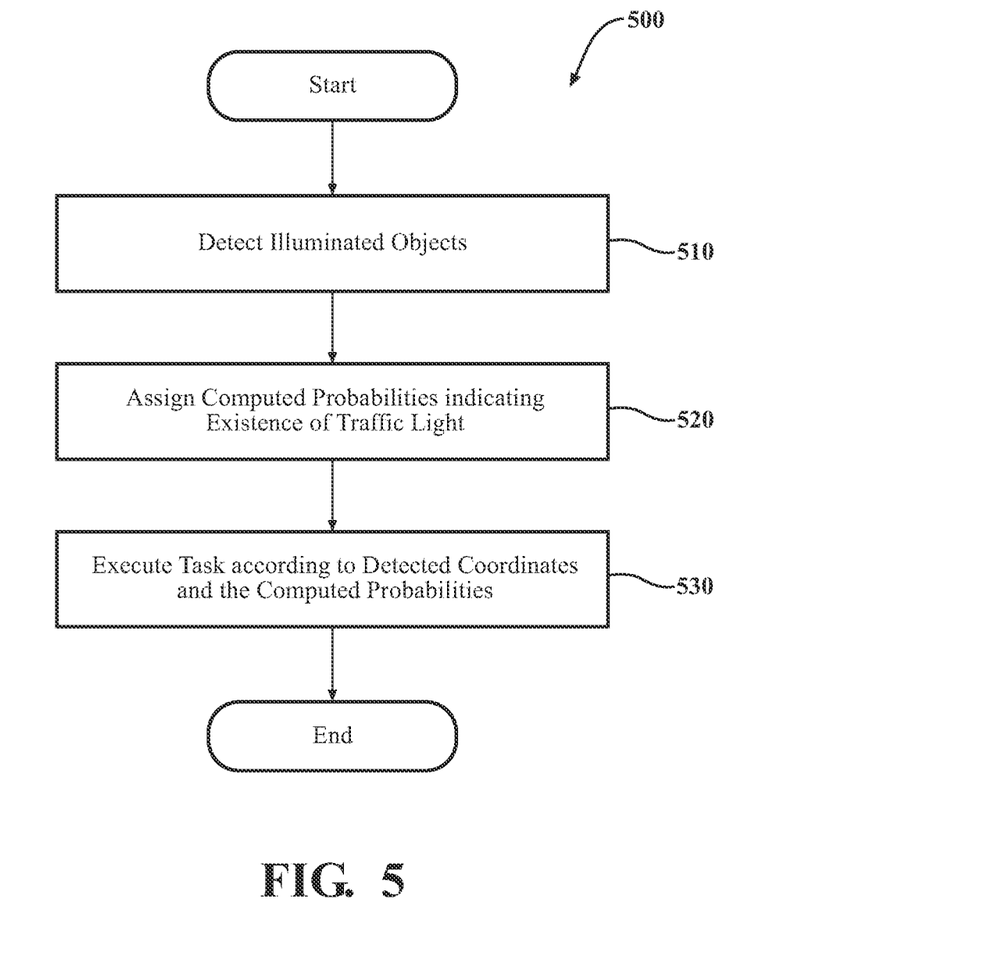
FIG. 5 illustrates one embodiment of a method that is associated with the ML model using image processing to compute probabilities that indicate the traffic light from other illuminated objects in a traffic scene.

Regarding FIG. 5, a flowchart of a method 500 that is associated with improving the detection of traffic lights from other objects in an image using ML and hierarchical modeling is illustrated. Method 500 will be discussed from the perspective of the detection system 170 of FIGS. 1 and 2. While the method 500 is discussed in combination with the detection system 170, it should be appreciated that the method 500 is not limited to being implemented within the detection system 170 but is instead one example of a system that may implement the method 500.

At 510, the detection system 170 detects illuminated objects. As previously explained, the encoder 410 may detect or extract features of illuminated objects within an image taken from a certain or single view, such as by a monocular camera. The detection head 420 may decode the features and output a location of light irrespective of type (e.g., pedestrian, brake light, traffic light, etc.). This may involve detecting 2D coordinates of a traffic scene for control adaptation by a control model (e.g., a NN estimating trajectories). In one approach, a location has coordinates indicating x-y position, h, and w geometries of an illuminated object relative to image pixels. For example, the h and w may be dimensions of a bounding box encompassing the illuminated object. Furthermore, these locations may be for an entire lighting structure instead of individual bulbs for reducing computational loads. In this way, the detection head 420 provides accurate locations of illuminated objects for processes by other tasks.

At 520, the assignment module 220 assigns computed probabilities indicating the existence of a traffic light (e.g., multi-lamp signals, railroad signals, crosswalk signals, etc.). This may involve assigning probabilities to illuminated objects for categories along hierarchical layers that operate as a decision tree using a ML Model (e.g., NN). Here, the recognition head 430 may compute a multi-layer probability using the encoded features as previously explained. Implementing a hierarchy instead of a flat structure allows the detection system 170 to accurately distinguish a traffic light from other light sources through probabilistic relationships. The hierarchical ontology instead of a flat architecture also helps train the ML model efficiently through intuitive loss function calculations. As such, a first layer can include a traffic light, a brake light, and a foreign light (e.g., pedestrian light) type. A second layer may include color/state/shape categories and a third layer color categories. In one approach, the second layer may be a level up or down, depending on a relative perspective, from the first layer. Furthermore, in various implementations, the hierarchical ontology includes any number of layers, colors, states, and so on to fully categorize illuminated objects within a traffic scene. For example, the recognition head 430 can output that the illuminated objects have a 99% probability of being a traffic light and 1% probability of a brake light. In this way, a downstream process can reliably compute a task knowing that a traffic light instead of a brake light is present within a traffic scene.

Moreover, in one approach the detection system 170 computes probabilities that can be a multiple or conditional metric between layers. In particular, probabilities from a higher level to a lower level (i.e., leaf nodes in a decision tree) may be multiplied along levels of the tree. As previously explained, this can also involve a probability computed for one layer being a conditional probability of another layer. For instance, a state probability (e.g., a red and round traffic light) for a third layer is conditioned from the first layer (e.g., light type) and a second layer (e.g., light shape). In this way, downstream processes derive enhanced insights from outputs by the recognition head 430 through inferring states and relationships between a traffic light and other lights within the hierarchical ontology.

Now turning to 530, a control system 340 executes a task according to detected coordinates (e.g., 2D coordinates) and the computed probabilities from feature decodings. Here, the control system 340 may perform object detection, object tracking, motion planning, and so on as downstream processes. In this way, the control system 340 adapts models and control tasks according to the computed probabilities. In one approach, an ADS treats an illuminated object as a traffic light for estimating trajectories when a threshold for the computed probability is met or unmet (e.g., a 70% probability). In addition, the detection system 170 for this operation may compute probabilities that clearly (e.g., a binary output) distinguish a traffic light from a brake light existing within the traffic scene. Accordingly, the detection system 170 identifies a traffic light from a brake light and computes probabilistic states within a hierarchical ontology using a unified ML model that improves accuracy and assists the reliability of downstream processes.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle

100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangements or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the detection system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140 and, thus, may be partially or fully autonomous as defined by the society of automotive engineers (SAE) levels 0 to 5.

The processor(s) 110, the detection system 170, and/or the automated driving module(s) 160 can be operatively connected to communicate with the various vehicle systems 140 and/or individual components thereof. For example, returning to FIG. 1, the processor(s) 110, the detection system 170, and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140.

The processor(s) 110, the detection system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the detection system 170, and/or the automated driving module(s) 160 can control the direction and/or speed of the vehicle 100. The processor(s) 110, the detection system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5 but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A detection system that identifies scene illuminations, comprising:
    a processor; and
    a memory storing instructions that, when executed by the processor, cause the processor to:
        detect, using a location decoder of a machine learning (ML) model, two-dimensional (2D) coordinates of illuminated objects identified from a monocular image of a traffic scene for control adaptation by a control model;
        assign, using a recognition decoder of the ML model, computed probabilities to the illuminated objects for separate categories by successively decoding layers individually from a hierarchical ontology of environmental lights associated with the traffic scene, wherein the layers include a first layer about traffic light types having a conditional connection with a second layer about traffic light shapes, and the second layer is coupled with a third layer deriving a color probability about a traffic light from the computed probabilities, and the color probability indicates existence of the traffic light instead of a brake light in the traffic scene; and
        execute a task by the control model for a vehicle according to the 2D coordinates and the computed probabilities.

2. The detection system of claim 1, wherein the instructions to assign the computed probabilities further include instructions to compute an initial probability in the first layer of the hierarchical ontology representing presence of the traffic light, the brake light, and a foreign light, and the conditional connection is associated with the initial probability.

3. The detection system of claim 2, wherein the instructions to assign the computed probabilities further include instructions to compute, using a decision tree by the ML model, a state probability for the third layer that a combined probability from the first layer and the second layer indicates the illuminated objects are the traffic light, wherein the first layer and the second layer have independent probabilities about the separate categories and the separate categories are nodes of the decision tree.

4. The detection system of claim 2, wherein the second layer of the hierarchical ontology has shape categories and the third layer has color categories.

5. The detection system of claim 2, further including instructions to compute a conditional probability between the first layer and the second layer of the hierarchical ontology, wherein the second layer has shape categories.

6. The detection system of claim 1, wherein the computed probabilities include a conditional probability of the traffic light and the brake light existing within the traffic scene.

7. The detection system of claim 6, further including, in response to a threshold being unsatisfied for the computed probabilities indicating the traffic light, instructions to adapt speed of the vehicle by an automated driving system (ADS) using the control model.

8. The detection system of claim 1, wherein the environmental lights comprise the traffic light, the brake light, and a pedestrian light source.

9. A non-transitory computer-readable medium comprising:
    instructions that when executed by a processor cause the processor to:
        detect, using a location decoder of a machine learning (ML) model, two-dimensional (2D) coordinates of illuminated objects identified from a monocular image of a traffic scene for control adaptation by a control model;
        assign, using a recognition decoder of the ML model, computed probabilities to the illuminated objects for separate categories by successively decoding layers individually from a hierarchical ontology of environmental lights associated with the traffic scene, wherein the layers include a first layer about traffic light types having a conditional connection with a second layer about traffic light shapes, and the second layer is coupled with a third layer deriving a color probability about a traffic light from the computed probabilities, and the color probability indicates existence of the traffic light instead of a brake light in the traffic scene; and
        execute a task by the control model for a vehicle according to the 2D coordinates and the computed probabilities.

10. The non-transitory computer-readable medium of claim 9, wherein the instructions to assign the computed probabilities further include instructions to compute an initial probability in the first layer of the hierarchical ontology representing presence of the traffic light, the brake light, and a foreign light, and the conditional connection is associated with the initial probability.

11. The non-transitory computer-readable medium of claim 10, wherein the instructions to assign the computed probabilities further include instructions to compute, using a decision tree by the ML model, a state probability for the third layer that a combined probability from the first layer and the second layer indicates the illuminated objects are the traffic light, wherein the first layer and the second layer have independent probabilities about the separate categories and the separate categories are nodes of the decision tree.

12. The non-transitory computer-readable medium of claim 10, further including instructions to compute a conditional probability between the first layer and the second layer of the hierarchical ontology, wherein the second layer has shape categories.

13. A method comprising:
- detecting, using a location decoder of a machine learning (ML) model, two-dimensional (2D) coordinates of illuminated objects identified from a monocular image of a traffic scene for control adaptation by a control model;
- assigning, using a recognition decoder of the ML model, computed probabilities to the illuminated objects for separate categories by successively decoding layers individually from a hierarchical ontology of environmental lights associated with the traffic scene, wherein the layers include a first layer about traffic light types having a conditional connection with a second layer about traffic light shapes, and the second layer is coupled with a third layer deriving a color probability about a traffic light from the computed probabilities, and the color probability indicates existence of the traffic light instead of a brake light in the traffic scene; and
- executing a task by the control model for a vehicle according to the 2D coordinates and the computed probabilities.

14. The method of claim 13, wherein assigning the computed probabilities further includes computing an initial probability in the first layer of the hierarchical ontology representing presence of the traffic light, the brake light, and a foreign light, and the conditional connection is associated with the initial probability.

15. The method of claim 14, wherein assigning the computed probabilities further includes computing, using a decision tree by the ML model, a state probability for the third layer that a combined probability from the first layer and the second layer indicates the illuminated objects are the traffic light, wherein the first layer and the second layer have independent probabilities about the separate categories and the separate categories are nodes of the decision tree.

16. The method of claim 14, wherein the second layer of the hierarchical ontology has shape categories and the third layer has color categories.

17. The method of claim 14, further comprising:
- computing a conditional probability between the first layer and the second layer of the hierarchical ontology, wherein the second layer has shape categories.

18. The method of claim 13, wherein the computed probabilities include a conditional probability of the traffic light and the brake light existing within the traffic scene.

19. The method of claim 18, further comprising:
- in response to a threshold being unsatisfied for the computed probabilities indicating the traffic light, adapting speed of the vehicle by an automated driving system (ADS) using the control model.

20. The method of claim 13, wherein the environmental lights comprise the traffic light, the brake light, and a pedestrian light source.

* * * * *